US012664267B2

(12) United States Patent
Hershman

(10) Patent No.: US 12,664,267 B2
(45) Date of Patent: *Jun. 23, 2026

(54) PROCESSOR WITH IN-BAND FAULT-INJECTION DETECTION IN THE PRESENCE OF EXCEPTIONS

(71) Applicant: Nuvoton Technology Corporation, Taiwan (TW)

(72) Inventor: Ziv Hershman, Givat Shmuel (IL)

(73) Assignee: Novoton Technology Corp., Hsinchu (TW)

( * ) Notice: Subject to any disclaimer, the term of this patent is extended or adjusted under 35 U.S.C. 154(b) by 338 days.

This patent is subject to a terminal disclaimer.

(21) Appl. No.: 18/456,539

(22) Filed: Aug. 28, 2023

(65) Prior Publication Data

US 2023/0401313 A1     Dec. 14, 2023

Related U.S. Application Data

(63) Continuation-in-part of application No. 17/141,249, filed on Jan. 5, 2021, now Pat. No. 11,783,026.

(51) Int. Cl.
| | |
|---|---|
| *G06F 21/55* | (2013.01) |
| *G06F 11/10* | (2006.01) |
| *G06F 21/54* | (2013.01) |
| *G06F 21/71* | (2013.01) |

(52) U.S. Cl.
CPC .......... *G06F 21/554* (2013.01); *G06F 11/102* (2013.01); *G06F 21/54* (2013.01); *G06F 21/71* (2013.01)

(58) Field of Classification Search
CPC ............................ G06F 21/544; G06F 11/102
See application file for complete search history.

(56) References Cited

U.S. PATENT DOCUMENTS

| | | | | |
|---|---|---|---|---|
| 6,640,315 | B1 * | 10/2003 | Hwu ...................... | G06F 9/3842 |
| | | | | 712/E9.05 |
| 6,775,763 | B2 | 8/2004 | Sexton et al. | |
| 7,353,400 | B1 | 4/2008 | Folmsbee | |
| 7,380,195 | B1 * | 5/2008 | Wu ................... | H03M 13/2906 |
| | | | | 714/753 |

(Continued)

FOREIGN PATENT DOCUMENTS

| | | | | | |
|---|---|---|---|---|---|
| GB | | 2200482 A | * | 8/1988 | .......... G06F 11/3636 |
| WO | | 2010018071 A1 | | 2/2010 | |

OTHER PUBLICATIONS

CHKDSK—Wikipedia; Wikipedia The Free Encyclopedia, 6 pages, print: Sep. 26, 2025. (Year: 2025).*

(Continued)

*Primary Examiner* — Ponnoreay Pich
(74) *Attorney, Agent, or Firm* — Meitar Patents LTD.; Daniel Kligler

(57)     ABSTRACT

An apparatus for protecting a processor includes an input interface and protection circuitry. The input interface is configured to monitor code instructions that are processed by the processor. One or more of the code instructions include one or more error-detection bits. The protection circuitry is configured to detect one or more errors in the program code using the error-detection bits, and to initiate responsive actions in response to detecting the errors, while accounting for exception events occurring in the processor.

20 Claims, 3 Drawing Sheets

(56)         References Cited

U.S. PATENT DOCUMENTS

| | | | | |
|---|---|---|---|---|
| 8,069,376 | B2 | 11/2011 | Monferrer et al. | |
| 10,013,581 | B2* | 7/2018 | Hershman | G06F 21/75 |
| 10,303,544 | B1 | 5/2019 | Peterson et al. | |
| 11,783,026 | B2* | 10/2023 | Hershman | G06F 21/78 |
| | | | | 726/22 |
| 2004/0143710 | A1 | 7/2004 | Walmsley | |
| 2005/0235179 | A1 | 10/2005 | Pistoulet | |
| 2008/0126766 | A1 | 5/2008 | Chheda et al. | |
| 2008/0256301 | A1 | 10/2008 | Liardet et al. | |
| 2009/0315603 | A1 | 12/2009 | Bancel et al. | |
| 2011/0066925 | A1* | 3/2011 | Smith | G06F 11/10 |
| | | | | 714/E11.032 |
| 2013/0061104 | A1 | 3/2013 | Hartl | |
| 2015/0046908 | A1* | 2/2015 | Salsamendi | G06F 9/45533 |
| | | | | 717/129 |
| 2016/0098333 | A1 | 4/2016 | Hershman | |
| 2016/0196427 | A1 | 7/2016 | Davidov et al. | |
| 2017/0228304 | A1 | 8/2017 | Martinez | |
| 2018/0349231 | A1* | 12/2018 | Panda | G06F 11/0712 |
| 2019/0188391 | A1 | 6/2019 | Margalit | |
| 2020/0117458 | A1* | 4/2020 | Barnes | G06F 9/30054 |
| 2022/0070181 | A1* | 3/2022 | Liu | G06F 21/71 |
| 2022/0129545 | A1 | 4/2022 | Lim | |
| 2022/0215089 | A1* | 7/2022 | Hershman | G06F 21/54 |
| 2023/0401313 | A1* | 12/2023 | Hershman | G06F 21/554 |

OTHER PUBLICATIONS

De Clercq et al., "A Survey of Hardware-based Control Flow Integrity (CFI)," ACM Computing Surveys, Article A, pp. 1-27, Jul. 31, 2017.

\* cited by examiner

PROCESSOR WITH IN-BAND FAULT-INJECTION DETECTION IN THE PRESENCE OF EXCEPTIONS

CROSS-REFERENCE TO RELATED APPLICATIONS

This application is a continuation in part of U.S. patent application Ser. No. 17/141,249, filed Jan. 5, 2021, whose disclosure is incorporated herein by reference.

FIELD OF THE INVENTION

The present invention relates generally to microprocessors, and particularly to methods and systems for in-band error detection in microprocessor circuitry.

BACKGROUND OF THE INVENTION

Fault injection attacks are a family of techniques used for accessing, analyzing or extracting information from secure electronic circuitry, such as cryptographic circuitry. A fault injection attack typically involves causing a circuit, or a part thereof, to change its logical state and change its behavior in a way that assists the attacker in penetrating the circuit or the information it stores. A fault injection attack may be launched, for example, by physically contacting signal lines, by applying high-power laser or electromagnetic pulses, or by causing glitches on power supply or other external interfaces. Various techniques for detecting and/or mitigating fault injection attacks are known in the art.

SUMMARY OF THE INVENTION

An embodiment of the present invention that is described herein provides an apparatus for protecting a processor. The apparatus includes an input interface and protection circuitry. The input interface is configured to monitor code instructions that are processed by the processor. One or more of the code instructions include one or more error-detection bits. The protection circuitry is configured to detect one or more errors in the program code using the error-detection bits, and to initiate responsive actions in response to detecting the errors, while accounting for exception events occurring in the processor.

In some embodiments, the program code includes a code section that (i) has a deterministic code flow and (ii) includes at least one of the error-detection bits having been calculated over at least part of the code section, and the protection circuitry is configured to act upon an exception event occurring during processing of the code section by the processor. In an example embodiment, in response to the exception event, the protection circuitry is configured to abort checking for the errors in the code section. In another embodiment, the protection circuitry is configured to defer handling of the exception event by the processor at least until completion of checking for the errors in the code section.

In an alternative embodiment, in response to an exception event, the protection circuitry is configured to suspend checking for the errors and save a state of the checking, and to resume the checking from the saved state after handling of the exception event by the processor.

In a disclosed embodiment, in detecting the errors, the protection circuitry is configured to detect a fault-injection attack.

In an embodiment, one or more of the error-detection bits are inserted at reserved bit locations in one or more of the code instructions, and the protection circuitry is configured to extract the error-detection bits from the reserved bit locations.

In another embodiment one or more of the error-detection bits are inserted, in one or more of the code instructions, at de-facto reserved bit locations that do not affect execution of the code instructions, and the protection circuitry is configured to extract the error-detection bits from the de-facto reserved bit locations.

In yet another embodiment, one or more of the error-detection bits are inserted, in one or more jump instructions, at one or more bit locations (i) that are specified to indicate a jump offset but (ii) that the processor is configured to ignore.

In still another embodiment, one or more of the error-detection bits are inserted in one or more dedicated code instructions that are added to the program code for error detection, and the protection circuitry is configured to identify the dedicated code instructions and to extract the error-detection bits from the dedicated code instructions.

In an embodiment, the protection circuitry is configured to hold a definition of locations of the error-detection bits in the code instructions, and to extract the error-detection bits from the code instructions in accordance with the definition.

In an example embodiment, a given set of one or more error-detection bits is calculated over at least part of a given code instruction and is inserted into the given code instruction. In another embodiment, a given set of one or more error-detection bits is calculated over multiple selected bits in the program code, and at least one of the selected bits and at least one of the error-detection bits in the set are located in different code instructions.

In some embodiments the apparatus further includes insertion circuitry, which is configured to insert one or more of the error-detection bits into one or more of the code instructions that are provided to the processor for processing.

There is additionally provided, in accordance with an embodiment that is described herein, a processor including an instruction pipeline and protection circuitry. The instruction pipeline is configured to fetch and execute program code including code instructions, one or more of which code instructions including one or more error-detection bits. The protection circuitry is configured to monitor at least the error-detection bits in the code instructions, to detect one or more errors in the program code using the error-detection bits while accounting for exception events occurring in the processor, and to initiate a responsive action in response to detecting the errors.

There is also provided, in accordance with an embodiment that is described herein, a method for protecting a processor. The method includes monitoring code instructions that are processed by the processor, one or more of which code instructions including one or more error-detection bits. One or more errors are detected in the program code using the error-detection bits, while accounting for exception events occurring in the processor. A responsive action is initiated in response to detecting the errors.

Another embodiment that is described herein provides an apparatus for protecting a processor. The apparatus includes an input interface and protection circuitry. The input interface is configured to monitor code instructions that are processed by the processor, one or more of which code instructions including one or more error-detection bits. The protection circuitry is configured to detect an error in the program code using the error-detection bits, and to initiate a responsive action in response to detecting the error.

In an embodiment, the multiple selected bits are confined to a section of the program code having a deterministic code flow. In an example embodiment, the multiple selected bits are confined to a section of the program code that does not traverse jump instructions or jump-destination instructions.

There is additionally provided, in accordance with an embodiment of the present invention, a processor including an instruction pipeline and protection circuitry. The instruction pipeline is configured to fetch and execute program code including code instructions, one or more of which code instructions including one or more error-detection bits. The protection circuitry is configured to monitor at least the error-detection bits in the code instructions, and to initiate a responsive action in response to detecting, using the error-detection bits, an error in the program code.

There is also provided, in accordance with an embodiment of the present invention, a method for protecting a processor. The method includes monitoring code instructions that are processed by the processor, one or more of which code instructions including one or more error-detection bits. An error in the program code is detected using the error-detection bits, and a responsive action is initiated in response to detecting the error.

The present invention will be more fully understood from the following detailed description of the embodiments thereof, taken together with the drawings in which:

DETAILED DESCRIPTION OF EMBODIMENTS

Overview

Figure 1:
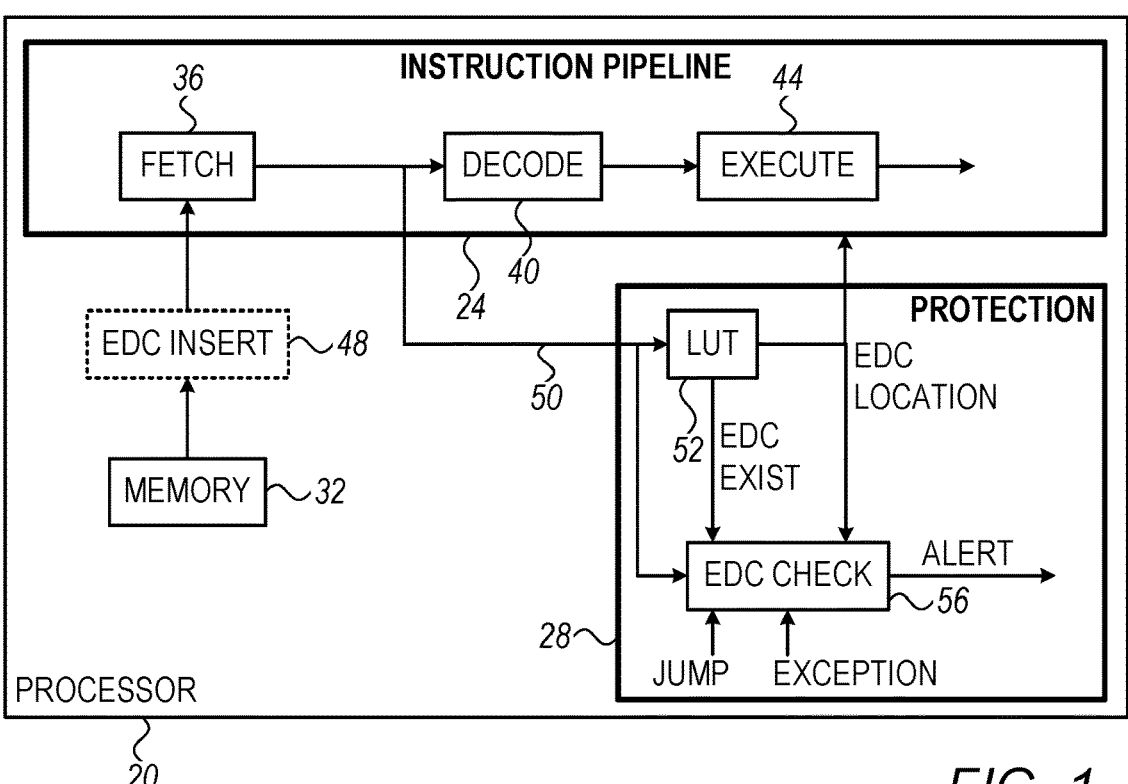
FIG. 1 is a block diagram that schematically illustrates a secure processor, in accordance with an embodiment of the present invention.

Embodiments of the present invention that are described herein provide methods and apparatus for protecting a processor from bit errors occurring in code instructions. Errors in code instructions may be caused, for example, by a fault-injection attack that attempts extracting sensitive information by causing the processor to operate abnormally. Generally, however, the disclosed techniques are useful in securing processors from errors caused by any hostile or innocent mechanism. In the present context, the term "processor" refers to various types of processors such as Central Processing Units (CPUs), Micro-Controller Units (MCUs), embedded controllers, processing cores and the like.

The processor typically comprises an instruction pipeline that is configured to fetch code instructions from memory and execute the fetched instructions. Each code instruction is drawn from a specified Instruction Set Architecture (ISA) of the processor, and is expressed and stored in memory as a group of bits. The bits define the opcode of the instruction, and possibly one or more operands. As can be appreciated, a bit error in any of the bits of an instruction may cause unpredictable results and is highly undesirable.

Some embodiments of the present invention provide protection circuitry that protects the processor from bit errors. The protection circuitry monitors one or more error-detection bits, which are inserted into one or more of the code instructions. Upon detecting an error in the program code using the error-detection bits, the protection circuitry initiates a suitable responsive action.

In some embodiments the protection circuitry is implemented as an integral part of the processor. In alternative embodiments the protection circuitry is external to the processor. In some embodiments the error-detection bits are inserted into the code instructions in advance, e.g., by a compiler or post-processor, so that the program code stored in memory already contains the error-detection bits. In alternative embodiments the error-detection bits are inserted into the code instructions at run-time. For example, dedicated insertion circuitry may insert error-detection bits into code instructions that are fetched from memory and are to be provided to the processor.

In some embodiments, the error-detection bits are inserted into existing bit locations in the instructions, without modifying the specified ISA of the processor, and without extending the instruction size ("width"). This feature is important, for example, for preserving the instruction throughput of the processor, as well as for backward compatibility with legacy processors. Various techniques for reusing existing bit locations for error-detection bits are described herein.

In some embodiments, error detection is applied independently per instruction. In such embodiments, the error-detection bits in a certain instruction are calculated only over (some or all) bits of the same instruction. In other embodiments, error detection is applied across instruction boundaries, e.g., over entire sections of the program code. In some embodiments, additional commands are inserted into the program code for the sake of error detection.

In some embodiments, the protection circuitry detects errors in the program code while accounting for exception events (e.g., interrupts) occurring in the processor. An exception event (also referred to simply as "exception") typically causes the processor to jump to a specified address for executing program code that handles the exception. After exception handling is completed, the processor returns to the normal program flow.

Consider, for example, a code section that (i) has a deterministic code flow and (ii) comprises one or more error-detection bits that have been calculated over at least part of the code section. Unless exception events are accounted for, if an exception occurs during processing of the code section, error detection for the code section will be disrupted and errors may go undetected.

In various embodiments, the disclosed protection circuitry employs various techniques for completing the error detection over the code section, even when an exception event occurs during the process. In an example embodiment, the protection circuitry defers handling of the exception event by the processor at least until completion of checking for errors in the code section. In another embodiment, the protection circuitry responds to an exception by suspending checking for errors and saving the current state of the checking. After handling of the exception event is completed, the protection circuitry resumes error detection from the point it was suspended (i.e., from the saved state).

The embodiments described herein refer mainly to parity, but any other suitable error-detection scheme can be used in alternative embodiments. The error-detection bits are also referred to herein as Error-Detection Code (EDC) bits, for brevity.

The disclosed techniques provide an efficient yet cost-effective means for protecting processors from bit errors in code instructions.

System Description

FIG. 1 is a block diagram that schematically illustrates a secure processor 20, in accordance with an embodiment of the present invention. In the embodiment of FIG. 1, processor 20 comprises an instruction pipeline 24 that fetches and executes program code, a memory 32 that stores the program code, and protection circuitry 28 that protects the processor from bit errors that may occur in the program code.

Instruction pipeline 24 comprises multiple pipeline stages. In the present example, pipeline 24 comprises a fetch unit 36, a decode unit 40 and one or more execution units 44. Fetch unit 36 fetches code instructions from memory 32. Decode unit 40 decodes the fetched instructions. Execution units 44 execute the decided instructions. Execution units 44 may comprise, for example, one or more Load-Store Units (LSUs), Arithmetic Logic Units (ALUs), Branch units, or any other suitable execution units.

Protection circuitry 28 identifies bit errors in the program code using error-detection bits (also referred to as EDC bits) that are inserted at predefined bit locations in one or more of the code instructions. In the present context, the terms "bit errors in the program code" and "bit errors in code instructions" refer to errors that are introduced into the code, whether maliciously or innocently, after the program code has been provided to the system or to the processor (e.g., after the original program code has been stored in memory 32). In other words, in the disclosed techniques the original program code provided to the system or to the processor (e.g., the program code originally stored in memory 32) is free of the errors mitigated by the disclosed technique.

The description below refers mainly to parity bits, by way of example. When using parity, each parity bit is computed over a predefined set of bits of the code instructions. If the number of "1" values in the set is odd, the parity bit is set to "1"; and if the number of "1" values in the set is even, the parity bit is set to "0". Parity check can be used to detect multiple errors, such as, for example, in Hamming codes. Other error detection schemes, such as CRC, hash, sha, multi-bit parity, or any other suitable scheme, can be used to implement the disclosed techniques.

In some embodiments, the program code stored in memory 32 already comprises the EDC bits. For example, the EDC bits may be inserted by a compiler, or by a post-processor that processes the compiled program code produced by the compiler. In other embodiments, the program code stored in memory 32 does not contain EDC bits, and processor 20 further comprises an EDC insertion circuit 48 that inserts the EDC bits into the program code at run-time. In an embodiment, EDC insertion circuit is placed in-line between memory 32 and pipeline 24, and inserts EDC bits into one or more of the code instructions that fetch unit 36 fetches from memory.

In the embodiment of FIG. 1, protection circuitry 28 receives the code instructions that pass through pipeline 24 using an interface 50. Protection circuitry 28 typically holds a definition of the EDC scheme, e.g., a definition of (i) the locations of the EDC bits in the code instructions, and (ii) the locations of the corresponding bits over which the EDC bits are calculated. Using this definition, protection circuitry 28 verifies whether the values of the EDC bits are indicative of one or more bit errors in the program code.

In the present example, the EDC scheme defines at most one EDC bit per code instruction. When a code instruction contains an EDC bit, the EDC bit is calculated as the parity over all the other bits of the instruction, or over a predefined part of the instruction. Processing circuitry 28 in this example comprises a Look-up Table (LUT) 52 that specifies the EDC scheme. For each instruction that is monitored via interface 50, LUT 52 generates two outputs: (i) an "EDC exist" bit that specifies whether this instruction comprises an EDC bit, and (ii) an "EDC location" bit that specifies the location of the EDC bit. In alternative embodiments, LUT 52 may have any other suitable structure and outputs for supporting other kinds of EDC schemes. Further alternatively, the EDC scheme may be defined and stored using any other suitable circuitry or data structure, not necessarily using a LUT.

Protection circuitry 28 further comprises EDC checking logic 56, which verifies whether the EDC bits are indicative of any bit errors in the program code. In the present example, logic 56 receives as input the code instructions monitored via interface 50. For each instruction, logic 56 receives the corresponding "EDC exist" and "EDC location" bits produced by LUT 56. For a given instruction, if the corresponding "EDC exist" bit is "1", logic 56 calculates the parity (odd/even) of the appropriate bits in the instruction and compares it to the value of the bit at location "EDC location". If the parity (odd/even) calculated over the appropriate bits in the instruction does not match the value of the bit at location "EDC location", logic 56 concludes that a bit error occurred in the instruction, and initiates a suitable responsive action.

In various embodiments, logic 56 may initiate various kinds of responsive actions. For example, logic 56 may issue an alert, indicating that a fault-injection attack may be in progress. Additionally or alternatively, logic 56 may disable the processor or parts thereof, erase sensitive data from the processor, or initiate any other suitable action.

As seen in the figure, the "EDC location" bit is also provided to pipeline 24 (typically to decode unit 40). In some embodiments, elements of pipeline 24 (e.g., decode unit 40) may need to be aware of the location of the EDC bit in the instruction in order to ignore it. This aspect is explained in detail further below. In some embodiments logic 56 also receives a "Jump" input that is asserted when the currently monitored instruction is a jump instruction or a jump-destination instruction (a "target" or "landing" instruction to which a jump is made). In some embodiments logic 56 further receives an "Exception" input that is asserted when an exception occurs in the processor. The "Jump" input is used for marking boundaries between separate code sections in which the EDC bits are checked separately. The "Exception" input is used for temporarily disabling or suspending error-detection checking. These aspects are explained in detail further below, as well.

Figure 3:
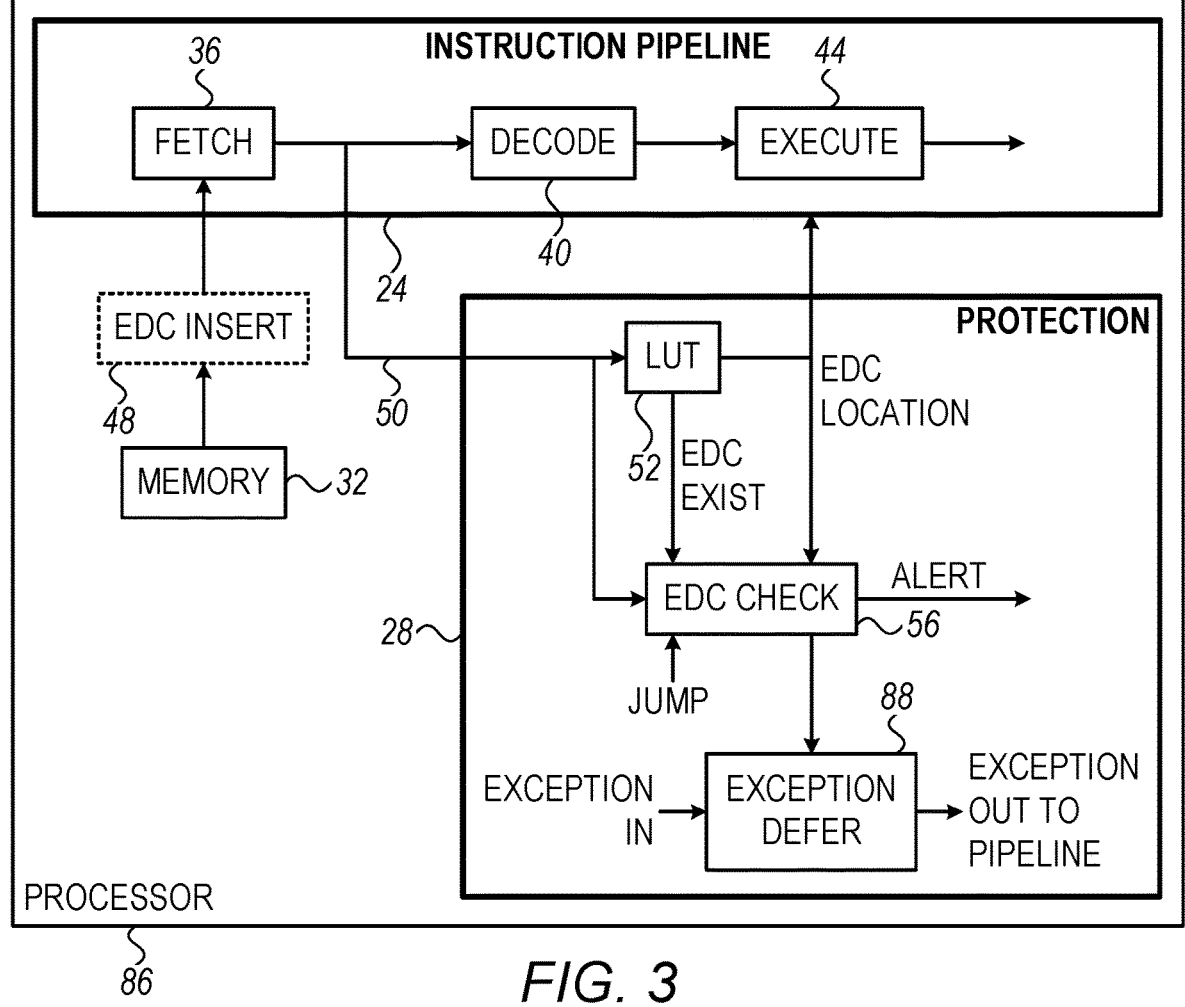
FIGS. 3 and 4 are block diagrams that schematically illustrates secure processors, in accordance with alternative embodiments of the present invention.
Figure 4:
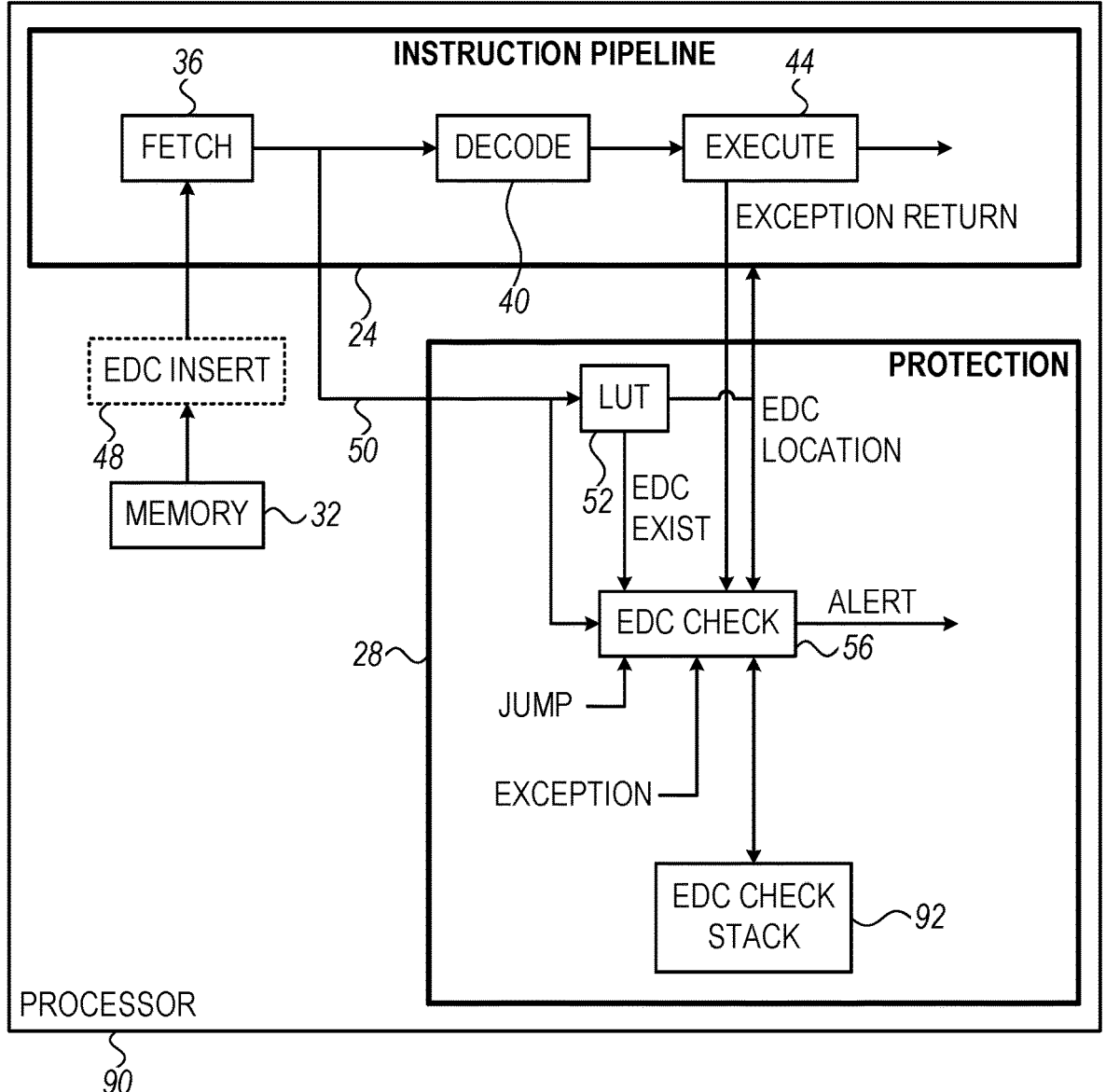

The configurations of processor 20 and of protection circuitry 28 shown in FIG. 1, and the configurations of the processors and protection circuitries shown in FIGS. 3 and 4, are example configurations that are depicted purely for the sake of conceptual clarity. In alternative embodiments, any other suitable configurations can be used.

For example, in FIG. 1 memory 32 is shown as part of the processor. In alternative embodiments, memory 32 may be external to the processor, and/or accessible via a suitable instruction cache.

As another example, in FIG. 1 protection circuitry 28 is shown as an integral part of processor 20. Alternatively, protection circuitry 28 may be external to the processor.

Similarly, EDC insertion circuitry 48 (if used) may be external to the processor. Thus, the disclosed techniques are suitable for use with conventional general-purpose processors, by coupling of external circuitry.

As yet another example, although in FIG. 1 the instructions are provided to protection circuitry 28 from the output of fetch unit 36, the disclosed techniques are not limited to this configuration. In alternative embodiments, interface 50 may transfer the instructions to protection circuitry from any other suitable point in pipeline 24, e.g., from the output of decode unit 40 or even from the output of execution units 44. In an embodiment, if obtaining the instructions from a late stage of the pipeline, protection circuitry 28 may need to reconstruct the original format of the instructions after fetching (the format in which the instructions were stored in memory 32) in order to correlate the EDC bits with the other bits of the instructions. In an alternative embodiment, the compiler or post-processor may insert the EDC bits into the code while taking into account the structure of the instructions at the sampling point of interface 50. When using this technique, care should be taken that the elements of pipeline 24 do not discard the EDC bits before they reach interface 50.

Moreover, the structure of pipeline 24 is highly simplified for the sake of clarity. Real-life processors may comprise a more complex instruction pipeline. Furthermore, the disclosed techniques are not limited for use with pipelined processors, and can be used with processors having any other suitable microarchitecture. Generally, elements that are not mandatory for understanding of the disclosed techniques have been omitted for the sake of clarity.

In various embodiments, any of the disclosed circuits (e.g., any of the circuits shown in FIGS. 1, 3 and 4) may be implemented using any suitable hardware or firmware, such as using one or more discrete components, one or more Application-Specific Integrated Circuits (ASICs) and/or one or more Field-Programmable Gate Arrays (FPGAs).

In some embodiments, the processor being secured may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
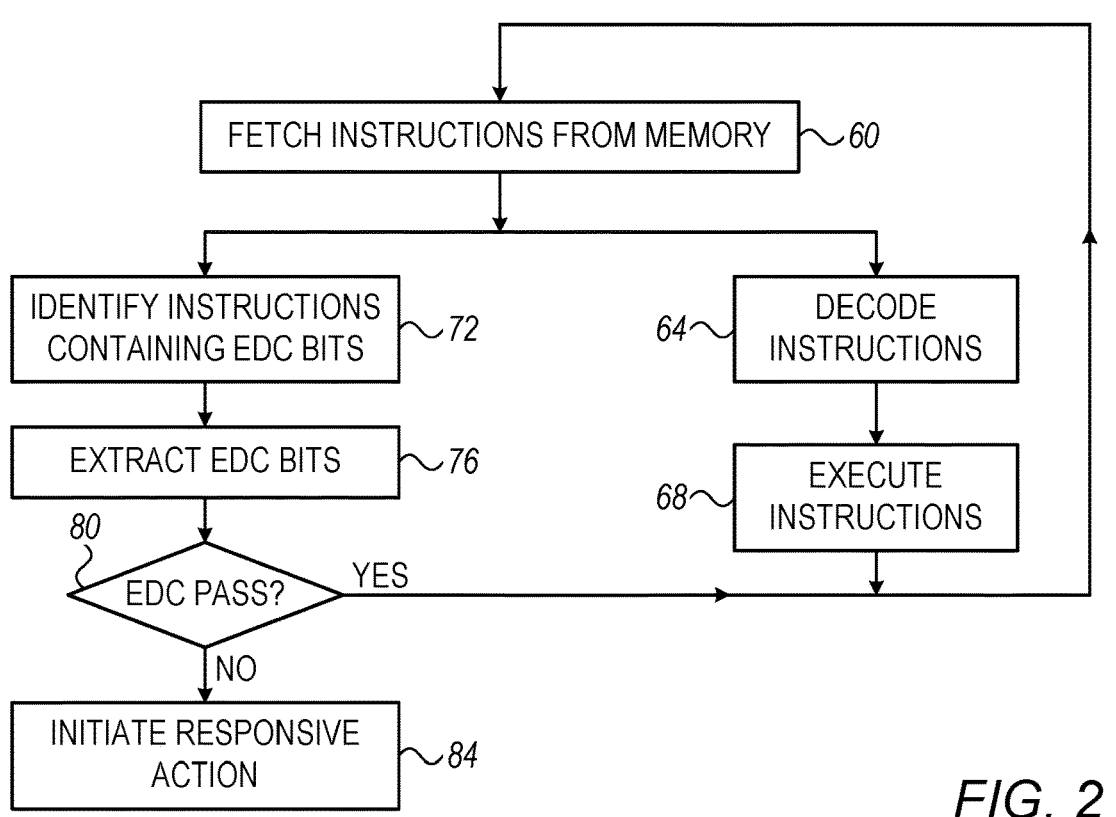
FIG. 2 is a flow chart that schematically illustrates a method for protecting a processor, in accordance with an embodiment of the present invention.

FIG. 2 is a flow chart that schematically illustrates a method for securing processor 20, in accordance with an embodiment of the present invention. The method begins with fetch unit 36 fetching one or more code instructions from memory 32, at a fetching step 60. The fetched instructions are provided both to decode unit 40 and to protection circuitry 28. The method flow therefore splits into two parallel branches.

At a decoding step 64, decode unit 40 decodes the fetched instructions. At an execution step 68, execution units 44 execute the instructions, and the method flow loops back to step 60 for fetching the next instructions from memory.

At an identification step 72, processing circuitry 28 identifies which of the code instructions contain EDC bits, and the locations of the EDC bits within these instructions. At an extraction step 76, processing circuitry 28 extracts the EDC bits from the instructions. At an EDC checking step 80, protection circuitry 28 checks whether the values of the EDC bits are indicative of any bit errors in the code instructions.

If the EDC bits do not indicate an error ("EDC PASS"), the method flow loops back to step 60. Otherwise, if the EDC bits indicate a bit error ("EDC FAIL"), protection circuitry 28 initiates a responsive action, at an action triggering step 84.

The flow of FIG. 2 is an example flow that is depicted purely for the sake of conceptual clarity. In alternative embodiments, any other suitable flow can be used.

For example, processor 20 may support a "secure" operational mode in which EDC insertion and checking are enabled, and a "normal" operational mode in which EDC insertion and checking are disabled. The mode can be configured, for example, per code address range.

Bit Locations for EDC Bits

In various embodiments, the EDC schemes used by protection circuitry 28 may differ from one another, for example, in the locations of the EDC bits in the code instructions and in the program code as a whole.

In some embodiments, one or more of the EDC bits are inserted (e.g., by the compiler or post-processor, or by insertion circuit 48) at bit locations that are defined as "reserved" according to the processor's ISA. Bit values at "reserved" locations are ignored by pipeline 24, and therefore modifying such bit values has no effect on code execution.

In some embodiments, one or more of the EDC bits are inserted (e.g., by the compiler or post-processor, or by insertion circuit 48) at bit locations that are "de-facto reserved". In the present context, the term "de-facto reserved bit location" refers to a bit location that is not defined as reserved in the processor's ISA, but is nevertheless ignored by pipeline 24 and has no effect on code execution. One non-limiting example of a de-facto reserved bit location is an address bit that is beyond the applicable address range of the processor. Consider, for example, a case where the instruction structure specifies an n-bit address, but the address space used in practice in the program code uses only n−1 bits. In such a case, the n'th bit of the address can be safely used as an EDC bit even though it is not formally defined as "reserved" in the ISA.

As another example, some ISAs support multiple jump commands that differ in the maximal size of the jump (the size of the jump offset). This feature is helpful in reducing the instruction size when performing jumps with small offsets. In some embodiments, the compiler or post-processor is set to use jump commands where the jump address or offset is defined in the instruction operands (rather than in a register, whenever possible) with a larger offset size larger than the actual size needed, so that one or more Most-Significant Bits (MSBs) of the offset value can be used as EDC bits. In these embodiments, the processor should also be aware of this convention, so that pipeline 24 (e.g., branch execution units) will ignore the EDC bits.

Consider, for example, an ISA that supports two types of jump commands—A "normal" jump that allows jump offsets of up to ±24 bits, and a "near" jump that allows jump offsets of up to ±16 bits. In an embodiment, the compiler or post-processor is configured to (i) always allow jump offsets of only up to ±16 bits, but (ii) always use the "normal" jump instruction type. This configuration leaves the eight MSBs of the jump offset unused, and de-facto reserved for use as EDC bits (to be inserted, for example, by the compiler or post-processor, or by insertion circuit 48).

Additionally or alternatively, various other instruction-assignment settings can be used in the compiler or post-processor, for creating de-facto unused bit locations that can be used for EDC. Additionally or alternatively, the compiler or post-processor may generally be set to favor instructions having redundancy. This feature creates more de-facto unused bits that can be exploited for EDC. The favoring of such instructions can be enabled, disabled or otherwise configured to match the applicable security/efficiency trade-off.

In some embodiments, the compiler or post-processor adds one or more dedicated code instructions to the program code for the sake of EDC, and inserts EDC bits into these instructions. The compiler or post-processor may generate such NOP instructions, for example, at periodic intervals in the program code. Protection circuitry 28 in these embodiments is configured to identify the dedicated instructions, and to extract the EDC bits therefrom. The dedicated instructions may comprise, for example, "No-operation" (NOP) commands that are specified in the ISA to be ignored by the processor, but usually have some room for reserved, or de-facto reserved, bits.

Additionally or alternatively, instructions can be set to be "de-facto NOP" or "NOP-like", by coordination with protection circuitry 28 and with the compiler or post-processor. For example, a certain register of the processor can be set aside and not used in the actual program code. The compiler or post-processor may generate instructions that refer to this register, e.g., at periodic intervals in the program code, and insert EDC bits in these instructions. Protection circuitry 28 in these embodiments is configured to identify instructions that refer to the register in question, and to extract the EDC bits therefrom. Various other coordination schemes can be used, for dedicating various commands for EDC in a manner that does not affect normal code execution.

When using NOP or NOP-like instructions, a hybrid scheme is also possible, in which the compiler or post-processor generates the NOP or NOP-like instructions (e.g., at periodic intervals) but does not insert EDC bits into them. At runtime, insertion circuit 48 inserts EDC bits into one or more of the NOP or NOP-like instructions generated by the compiler or post-processor.

The schemes described above are chosen purely by way of example. In alternative embodiments, any other suitable bit locations may be used for EDC bits.

Code Coverage by EDC Schemes

In various embodiments, the EDC schemes used by protection circuitry 28 may differ from one another, for example, in the portions of the code that are protected by the EDC.

For example, in some embodiments the EDC scheme is "intra-instruction", i.e., an EDC bit inserted in a given instruction is calculated over (and therefore protects) only one or more other bits of the same code instruction. For example, an EDC bit may be calculated (e.g., by the compiler or post-processor, or by insertion circuit 48) as the parity of all the other bits in the instruction, or over a predefined part of the instruction. In other embodiments, the EDC scheme spans across the instruction boundary, in the sense that a given EDC bit may be calculated over (and therefore protect) multiple bits selected in multiple code instructions.

In some embodiments, the EDC scheme is capable of protecting the entire program code, or at least the vast majority of the code. Consider, for example, an embodiment in which the program code is divided into sections, and a group of one or more EDC bits is inserted (e.g., by the compiler or post-processor, or by insertion circuit 48) in each section. Each group of one or more EDC bits is calculated over (and therefore protects) its entire code section.

As can be appreciated, in order for the above scheme to function properly, each code section being protected should have a deterministic (i.e., not data-dependent or otherwise variable or unpredictable) code flow. In the present context, the term "code section having a deterministic code flow" means that any execution of the code section will always follow that same sequence of instructions in the same order. The order in question is the order of instructions arriving in the protection circuitry for EDC checking. For example, if EDC checking is performed on the output of the fetch unit, it is permissible for the processor pipeline to decode and execute instructions out-of-order. On the other hand, if fetching is performed out-of-order, the instructions should be re-ordered (e.g., by the protection circuitry) before EDC calculation and checking.

In example embodiment, this requirement is fulfilled by defining each section as the section between successive jump and/or jump-destination instructions. A "jump-desti-nation" instruction is an instruction that is jumped-to by a jump instruction in the program code. In other words, each group of one or more EDC bits is calculated over (and therefore protects) a code section that does not traverse any jump or jump-destination instruction. In this context, the term "does not traverse" excludes the first instruction and the last instruction of a section, which would typically be jump or jump-destination instructions.

In an embodiment, conditional branch instructions, unconditional jump instructions and also return instructions, are all regarded as jump instructions for the purpose of dividing the code into sections. When divided in this man-ner, each code section being protected does not traverse any jump or jump-destination instructions.

In some embodiments, every group of one or more EDC bits is calculated over (and therefore protects) a respective code section that begins no earlier than (but possibly after) at the previous jump or jump-destination instruction. The section ends no later than (but possibly before) at the next jump or jump-destination instruction.

In order to take jump-destination instructions into account, in some embodiments the compiler (or post-pro-cessor) analyzes the program code and marks the various possible jump-destination instructions. In various embodi-ments, various techniques can be used for identifying jump-destination instructions.

In one embodiment, a policy can be defined, whereby the compiler or post-processor guarantees that all jump instruc-tions jump to a specific type of instruction which is inserted into the program code for this purpose (i.e., all jump-destination instructions are of a specific, identifiable type). When using this convention, any jump instructions and instructions of the specific type can be used as section boundaries. For example, the policy may specify that all jump-destination instructions are NOP instructions, or instructions that act of a specific register. As another example, a policy may specify that the compiler or post-processor allow jumps only to a subset of addresses (e.g., only to an address having N LSBs==0). Additionally or alternatively, any other suitable convention can be used for defining jump-destination instructions. Generally, it is per-missible to define redundant jump-destination instructions, since this definition merely results in finer segmentation into smaller sections. Missing a genuine jump-destination instruction that was used for partitioning, on the other hand, is problematic.

Further alternatively, other forms of partitioning into sections are also feasible, as long as each code section has a deterministic code flow.

In an embodiment, a group of one or more EDC bits is inserted (e.g., by the compiler or post-processor, or by insertion circuit 48) into every jump instruction and jump-destination instruction, and is calculated over (and therefore protects) the entire code section since the previous jump or jump-destination instruction. Such a scheme protects the vast majority of the program code.

In an embodiment, a group of one or more EDC bits is inserted (e.g., by the compiler or post-processor, or by insertion circuit 48) into at least one instruction in each section having a deterministic code flow (e.g., anywhere within each section between successive jump/jump-destination instructions). The EDC bits in a given section are calculated over (and therefore protect) multiple selected bits in the code section, which may comprise bits in instructions that precede the EDC bits and/or bits in instructions that are subsequent to the EDC bits.

In another embodiment, a given instruction (e.g., a jump or jump-destination instruction that separates between adjacent code sections) comprises two types of EDC bits. One EDC bit is calculated over (and therefore protects) the instruction itself. The second EDC bit is calculated over (and therefore protects) the code section since the previous jump/jump-destination.

In the above embodiments, protection circuitry 28 may use the "Jump" input of EDC checking circuit 56 (FIG. 1) to mark the beginning of a code section being protected. In these embodiments, EDC checking circuit 56 resets and restarts calculation of the EDC (e.g., parity) on each assertion of the "Jump" input.

Another possible cause for a non-deterministic code flow is occurrence of an exception in processor 20. Therefore, in some embodiments protection circuitry 28 asserts the "Exception" input of EDC checking circuit 56 (FIG. 1) on each exception and on each return from executing the exception code. When the "Exception" input is asserted, EDC checking circuit 56 aborts the current EDC calculation, and also suspends checking for errors, until the beginning of the next code section having a deterministic code flow (e.g., until the next assertion of the "Jump" input).

EDC in the Presence of Exception Events

In some embodiments, protection circuitry 28 detects errors in the program code while accounting for exception events occurring in the processor. In the present context, the term "exception event" (or simply "exception") refers to any event that disrupts the normal execution of the main program code. Some exceptions instruct the processor to suspend execution of the main program code and jump to execute predefined program code that handles the exception. Once handling of the exception is completed, the processor returns to the point in the main program code at which execution was suspended. A typical example of an exception event is an interrupt (maskable or non-maskable). Other examples of exceptions include faults, traps, aborts, breakpoints, etc.

An exception that occurs while performing error detection over a code section can be problematic, since the exception disrupts the expected, deterministic flow of the code section. One way of accounting for an exception is to abort error detection for the code section in question, as described above. Such a solution will not detect errors in the code section, but on the other hand will prevent a false alarm caused by the exception. In some embodiments, protection circuitry 28 uses techniques that enable successful completion of error detection in a code section, even in the presence of exceptions. As a result, error detection coverage of the program code is not compromised by exception events.

FIG. 3 is a block diagram that schematically illustrates a secure processor 86, in accordance with an embodiment of the present invention. Processor 86 is similar to processor 20 of FIG. 1 above, but differs in the way exceptions are handled. The technique of FIG. 3 is best suited for exceptions whose handling can tolerate some delay (e.g., maskable interrupts).

In the present example, protection circuitry 28 of processor 86 comprises an exception deferral circuit 88, which defers handling of exception events until error detection is completed for the current code section. Deferral circuit 88 has the following interfaces:

"Exception in"—An input for receiving an exception event, e.g., an interrupt, destined to pipeline 24.

"Exception out"—An output that actually delivers the exception event to pipeline 24.

A control input from EDC checking logic 56, indicating that EDC checking is completed for the current code section.

In a typical embodiment, deferral circuit 88 receives an exception event (at the "Exception in" input) while pipeline 24 is in the process of executing a code section having a deterministic code flow. Circuit 88 inhibits (e.g., latches and delays) the exception event (i.e., does not assert the "Exception out" output) until receiving an indication from EDC checking logic 56 that EDC checking over the code section is completed. Only then, deferral circuit 88 asserts the "Exception out" output, thereby permitting pipeline 24 to jump to execute the exception handling code.

FIG. 4 is a block diagram that schematically illustrates a secure processor 90, in accordance with another embodiment of the present invention. Processor 90 is similar to processors 20 and 86 of FIGS. 1 and 3, but again differs in the way exceptions are handled. The technique of FIG. 4 may be better suited for time-critical exceptions (e.g., non-maskable interrupts) that need to be acted upon without delay.

In the example of FIG. 4, protection circuitry 28 of processor 90 comprises an EDC check stack 92 for storing states of EDC checking logic 56. In addition, an interface is provided between EDC checking logic 56 and pipeline 24, via which the pipeline notifies the EDC checking logic that exception handling is completed.

In a typical embodiment, when an exception occurs, logic 56 saves (pushes) the current state ("context") of the checking in stack 92, and suspends the checking. After receiving an indication from pipeline 24 that handling of the exception is completed, logic 56 reads the saved state from stack 92 (and also pops, i.e., removes, the saved state from stack 92), and resumes EDC checking from the point it was suspended using the saved state.

Checking for errors in the program code after returning from the exception (e.g., until the end of the current code section) can be performed in various ways and by various entities. In one embodiment, this checking is performed in software, e.g., by the exception handling code. In such an embodiment, the exception handling code may perform the following (in addition to the hardware-implemented push/pop mechanism that manages the EDC checking state using stack 92):

(i) Read the saved EDC checking state from stack 92 (but without popping it, i.e., without modifying stack 92).

(ii) Associate the EDC checking state with the Program Counter (PC) value that immediately preceded the exception, e.g., as obtained from the processor's interrupt stack.

(iii) Read the program code starting from the PC value obtained in stage (ii) as data, and continue EDC checking from the saved state until the end of the code section.

One advantage of the above process is that EDC checking does not need to wait until exception handling is completed. In an alternative embodiment, checking for errors after returning from the exception is performed in hardware, e.g., by a suitable state machine in logic 56.

Note that the techniques described above, which are based on pushing and popping the EDC state to and from a stack, work well with nested exceptions (e.g., nested interrupts) as well.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for protecting a processor, the apparatus comprising:

an input interface, configured to monitor code instructions that are processed by an instruction pipeline of the processor, one or more of which code instructions comprising one or more error-detection bits inserted at respective bit locations within the code instructions; and protection circuitry, configured to:

detect one or more errors in the program code using the error-detection bits in the code instructions, and initiate responsive actions in response to detecting the errors, while accounting for exception events occurring in the processor; and cause the instruction pipeline to ignore the error-detection bits while processing the code instructions, by notifying the instruction pipeline of the bit locations of the error-detection bits.

2. The apparatus according to claim 1, wherein the program code comprises a code section that (i) has a deterministic code flow and (ii) comprises at least one of the error-detection bits having been calculated over at least part of the code section, and wherein the protection circuitry is configured to act upon an exception event occurring during processing of the code section by the processor.

3. The apparatus according to claim 2, wherein, in response to the exception event, the protection circuitry is configured to abort checking for the errors in the code section.

4. The apparatus according to claim 2, wherein the protection circuitry is configured to defer handling of the exception event by the processor at least until completion of checking for the errors in the code section.

5. The apparatus according to claim 1, wherein, in response to an exception event, the protection circuitry is configured to:

suspend checking for the errors, and save a state of the checking; and after handling of the exception event by the processor, resume the checking from the saved state.

6. The apparatus according to claim 1, wherein, in detecting the errors, the protection circuitry is configured to detect a fault-injection attack.

7. The apparatus according to claim 1, wherein one or more of the error-detection bits are inserted at reserved bit locations in one or more of the code instructions, and wherein the protection circuitry is configured to extract the error-detection bits from the reserved bit locations.

8. The apparatus according to claim 1, wherein one or more of the error-detection bits are inserted, in one or more of the code instructions, at de-facto reserved bit locations that do not affect execution of the code instructions, and wherein the protection circuitry is configured to extract the error-detection bits from the de-facto reserved bit locations.

9. The apparatus according to claim 1, wherein one or more of the error-detection bits are inserted, in one or more jump instructions, at one or more bit locations (i) that are specified to indicate a jump offset but (ii) that the processor is configured to ignore.

10. The apparatus according to claim 1, wherein one or more of the error-detection bits are inserted in one or more additional code instructions that are added to the program code for error detection, and wherein the protection circuitry is configured to identify the additional code instructions and to extract the error-detection bits from the additional code instructions.

11. The apparatus according to claim 1, wherein the protection circuitry is configured to hold a definition of locations of the error-detection bits in the code instructions, and to extract the error-detection bits from the code instructions in accordance with the definition.

12. The apparatus according to claim 1, wherein a given set of one or more error-detection bits is calculated over at least part of a given code instruction and is inserted into the given code instruction.

13. The apparatus according to claim 1, wherein a given set of one or more error-detection bits is calculated over multiple selected bits in the program code, and wherein at least one of the selected bits and at least one of the error-detection bits in the set are located in different code instructions.

14. The apparatus according to claim 1, further comprising insertion circuitry, which is configured to insert one or more of the error-detection bits into one or more of the code instructions that are provided to the processor for processing.

15. A processor, comprising:

an instruction pipeline, configured to fetch and execute program code comprising code instructions, one or more of which code instructions comprising one or more error-detection bits inserted at respective bit locations within the code instructions; and protection circuitry, configured to:

monitor at least the error-detection bits in the code instructions, to detect one or more errors in the program code using the error-detection bits while accounting for exception events occurring in the processor, and to initiate a responsive action in response to detecting the errors; and cause the instruction pipeline to ignore the error-detection bits while processing the code instructions, by notifying the instruction pipeline of the bit locations of the error-detection bits.

16. A method for protecting a processor, the method comprising:

monitoring code instructions that are processed by an instruction pipeline of the processor, one or more of which code instructions comprising one or more error-detection bits inserted at respective bit locations within the code instructions;

detecting one or more errors in the program code using the error-detection bits in the code instructions, while accounting for exception events occurring in the processor;

initiating a responsive action in response to detecting the errors; and causing the instruction pipeline to ignore the error-detection bits while processing the code instructions, by notifying the instruction pipeline of the bit locations of the error-detection bits.

17. The method according to claim 16, wherein the program code comprises a code section that (i) has a deterministic code flow and (ii) comprises at least one of the error-detection bits having been calculated over at least part of the code section, and wherein accounting for the exception events comprises acting upon an exception event occurring during processing of the code section by the processor.

18. The method according to claim 17, wherein acting upon the exception event comprises aborting checking for the errors in the code section.

19. The method according to claim 17, wherein acting upon the exception event comprises deferring handling of the exception event by the processor at least until completion of checking for the errors in the code section.

20. The method according to claim 16, wherein accounting for the exception events comprises, upon occurrence of an exception event:

suspending checking for the errors in the code section, and saving a state of the checking; and after handling of the exception event by the processor, resuming the checking from the saved state.

\* \* \* \* \*